(12) United States Patent
Björn

(10) Patent No.: US 8,909,373 B2
(45) Date of Patent: Dec. 9, 2014

(54) ROBOT AND METHOD FOR CONTROLLING OF A ROBOT

(75) Inventor: Matthias Björn, Bad Schönborn (DE)

(73) Assignee: ABB AG, Mannheim (DE)

( * ) Notice: Subject to any disclaimer, the term of this patent is extended or adjusted under 35 U.S.C. 154(b) by 540 days.

(21) Appl. No.: 13/238,813

(22) Filed: Sep. 21, 2011

(65) Prior Publication Data

US 2012/0245733 A1 Sep. 27, 2012

Related U.S. Application Data

(63) Continuation of application No. PCT/EP2009/002255, filed on Mar. 27, 2009.

(51) Int. Cl.
*G05B 19/04* (2006.01)
*G05B 19/18* (2006.01)
*B25J 9/16* (2006.01)

(52) U.S. Cl.
CPC ..................... *B25J 9/1676* (2013.01)
USPC .......................... 700/253; 700/245

(58) Field of Classification Search
USPC ............. 700/245–264, 177; 701/253
See application file for complete search history.

(56) References Cited

U.S. PATENT DOCUMENTS

| 2003/0137219 A1 | 7/2003 | Heiligensetzer et al. |
| 2003/0233171 A1 | 12/2003 | Heiligensetzer |

FOREIGN PATENT DOCUMENTS

| EP | 1 323 503 A | 7/2003 |
| JP | 9-254079 A | 9/1997 |
| JP | 2008-142829 A | 6/2008 |

OTHER PUBLICATIONS

Charles C. Kemp et al., "Challenges for Robot Manipulation in Human Environments", IEEE Robotics & Automation Magazine, IEEE Service center, Piscataway, NJ, US, vol. 14, No. 1, Mar. 1, 2007, pp. 20-29.
Peter Heiligensetzer, "Aktuelle Entwicklungen bei Industrierobotern im Bereich der Mensch-Roboter Kooperation", Presentation Slides, Mar. 2009, pp. 1-35.
Weiss Robotics, http://www.weiss-robotics.de/produkte/kundenspezifische_messwandler.htm, 6 pages.
*International Search Report (PCT/ISA/210) issued on Feb. 17, 2010, by Japanese Patent Office as the International Searching Authority for International Application No. PCT/EP2009/002255.

*Primary Examiner* — Bhavesh V Amin
(74) *Attorney, Agent, or Firm* — Buchanan Ingersoll & Rooney PC

(57) ABSTRACT

An exemplary robot is disclosed with at least one turnable member wherein a free end of the member is moveable along a programmable path. A force or pressure or contact effect detector is included on an interaction point on the free end of the free member so that signals corresponding to the force or pressure or contact effect are producible. Control of the robot movement is performed according to the programmable path and according to predicted demands in the case of detection. In case of detection, the control will be carried out such that the robot movement is temporarily stopped, slowed down or not stopped and a temporary change of the programmable movement path can be determined in consideration of the produced signals. A homing method for controlling the robot is also disclosed.

16 Claims, 6 Drawing Sheets

Legend:
1 = starting a robot program
2 = controlling robot manipulator arm
3 = robot portion of working task
4 = human portion of working task
5 = overriding tactile / direct external force input by human onto manipulator arm

ROBOT AND METHOD FOR CONTROLLING OF A ROBOT

RELATED APPLICATION

This application claims priority as a continuation application under 35 U.S.C. §120 to PCT/EP2009/002255 filed as an International Application on Mar. 27, 2009 designating the U.S., the entire content of which is hereby incorporated by reference in its entirety.

FIELD

The disclosure relates to robots and robot control methods such as for an intrinsically safe small robot with at least one turnable member, wherein a free end of the member is moveable along a programmable path.

BACKGROUND INFORMATION

For robots exceeding a certain minimum size, a risk can exist for persons cooperating with these robots, if no additional protection mechanisms are foreseen. During co-operation within a working range of a free robot arm, persons could be injured or killed due to the speed of moving parts in case of a collision, such as with the free end of the robot arm. Therefore care can be taken care to prevent personnel from entering into the working envelope of the robot if the robot is active. This may be achieved by mechanical or virtual walls which prevent persons from entering the working area. Some robot systems include a turnable table such that an operating person on one side of a fence can load the turnable table with pieces and the robot's working area is provided on the other side of the fence.

Small robots which are inherently safe might not be capable of injuring a person in any state of their robot operation. The concept of an "inherently safe robot" is related to a robot which is inherently or intrinsically safe due to its design whereas the power and/or the force effected onto a person or fixed obstacles in case of a collision is limited by a appropriate design (e.g., useful constructive measures); see ISO 10218, part 1, 2006, par. 5.10.5. According to this concept, the force onto a person in case of a collision shall not exceed 150 N respectively, and the dynamic power onto a person shall not exceed 80 W. These conditions cannot be met or fulfilled over certain mechanical thresholds for masses and/or dimensions of a robot. Therefore heavy industrial robots with a rated power of several 100 W and over are not seen as small robots so that the disclosure may be viewed as less applicable for those robots.

The JP 09 254 079 is related to detection of a collision of a robot arm with a person or object using a speed sensing detector and by controlling brakes of a robot according to those signals. In case of a collision, the robot will be slowed down until a stationary position is reached where the robot stops. Afterwards the brakes will be released with a severity of the collision being of high importance.

SUMMARY

A robot is disclosed comprising at least one turnable member, a free end of the member being moveable along a programmable path; first means for detecting at least one of a force, pressure or contact effect on an interaction point on the free end of the free member; means for producing signals corresponding to the force or pressure or contact effect; and second means for controlling robot movement according to the programmable path and according to predicted demands in response to the detecting of at least one of a force, pressure or contact effect and for temporarily changing the programmable movement path based on the produced signals such that robot movement is at least one of temporarily stopped or slowed down.

A method for controlling a robot is disclosed comprising applying a force effect onto an interaction point on a turnable member of a robot; generating signals according to the force effect; processing the signals into control signals for the robot; controlling the robot to temporarily change a movement path of a free end of a robot member such that movement of the robot is temporarily at least one of stopped or not slowed.

BRIEF DESCRIPTION OF THE DRAWINGS

The disclosure will now be further explained by reference to an exemplary embodiment and with reference to the accompanying drawings, in which.

DETAILED DESCRIPTION

Figure 1:
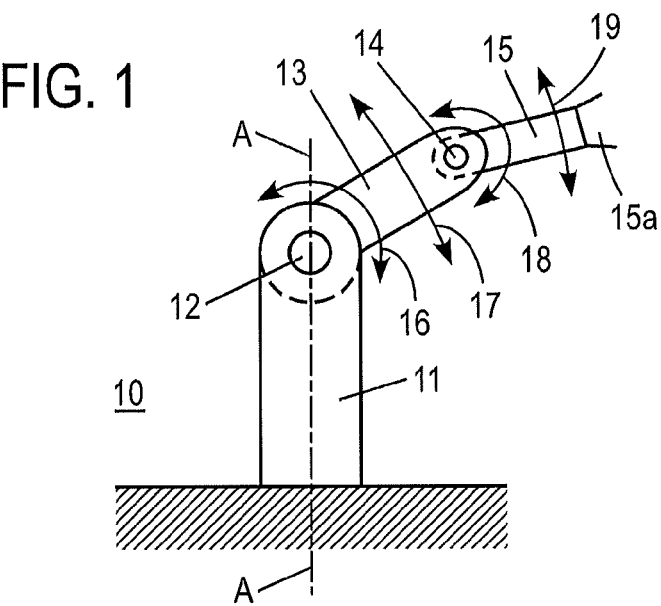
FIG. 1 is an exemplary schematic of a robot with more than two axles.

Exemplary embodiments as disclosed herein can include an improved control for a robot such as a robot considered to be an inherently or intrinsically safe robot with at least one movable arm.

Methods of controlling robots are also disclosed, such as small inherently or intrinsically safe robots.

According to the disclosure, an exemplary robot can be characterized as including first means (e.g., force sensor) for detecting a force or pressure or contact effect on at least an interaction point of at least a free end of at least a free member, and for producing signals corresponding to the force or pressure or contact effect. Second means (e.g., computer processor with memory) can be included for carrying out control of robot movement according to a programmable path and according to predicted demands specified in a case of a detection of a force or pressure or contact effect, and in a case of a detection, the control will carried out in such a way that the robot movement can be temporarily stopped, slowed down or not stopped and that a temporary change of the programmable movement path can be determined under consideration of the produced signals.

Of course this disclosure is not related only to a robot with one turnable member. It is rather realistic that the robot can comprise a total of three or even six (or more) turnable members which are connected in a mechanical chain. In the exemplary case of six turnable members, the robot can provide six degrees of freedom in movement and a tip of the robot arm could move to any point within its working range in any orientation.

The detection event or detection point is an interaction event or an interaction point where the robot interacts with a person or an obstacle. This interaction could be for example an unintended collision of the robot, but also some targeted force impacts of a person onto the robot. Those force impacts can be sensed by the first means, for example some suitable sensors, and fed to the second means, for example the control system of the robot. Special safety actions of the robot, such as an emergency stop, need not be required since there is no danger to a person due to the intrinsically safe construction of the robot. It is rather within the scope of the disclosure to interpret the measured signals and to temporarily determine an action based thereon. This could be for example the change of the programmed movement path if a certain and permanent force is applied onto the robot arm into another direction than the movement direction. A reason for this could be, for example, that a co-operating person wants to move the robot in another direction and applies the permanent force manually on the robot arm.

In another embodiment, for example in the case of a collision with a fixed obstacle, the robot control could be carried out in that the robot slows down, or stops. Further commands based on a force impact on the robot could be expected in a kind of wait mode of the robot. The communication between robot and co-operating person can be increased in an advantageous way by this.

In an exemplary embodiment, the sensing of the force impact can be done for example by measuring the current flow through an electric motor drive of one or more members of the robot or by dedicated movement sensors.

The force effect may be caused by a collision of the at least free arm with a person or a fixed obstacle. Exemplary means for detecting a force effect onto a robot arm are well known and commercially available.

It is also possible to detect and determine a force effect onto a robot arm by comparing an actual measured actual motor current for driving the electric motors of the robot members with an expected actual motor current, where both current signals are provided to a signal computing device. The amount of the difference is for example continuously determined and based on the actual values detected or calculated, where this difference can be used as an indicator for the severity of the collision. The expected measurement values of the motor current might be based on former actual (i.e., real) measurements of a robot without interaction or collision and stored within the signal computing device, for example the robot controller.

According to a further exemplary embodiment, the force effect can be applied manually onto at least one of the interaction points of at least one of the robot members, such as the robot arm.

An exemplary manual effect onto a robot arm for human-robot cooperation is known from a publication of the Institute of Process Control and Robotics of the Technical University (TH, TU) Karlsruhe. A member of a robot arm is surrounded by a collar in form of a cylindrical measuring transducer for selectively conducting the motion of the robot member. The measuring transducer can comprise a number of tactile measuring points with a certain resolution in position and force; see also Internet site:
http://www.weiss-robotics.de/produkte/kundenspezifis-
 che_messwandler.htm (incorporated by reference herein in its entirety as of the filing date).

A certain force effect can be applied onto one of the members of the robot by, for instance, applying at least one manual push against the robot member. The number of the pushes and their individual strengths may be extractable as information from the real measured currents of the motor(s) of the robot and are determinable by the signal processing device.

The collision of the at least one robot member with an operating person, a moveable or a fixed obstacle will produce signals very similar to the signals produced by the manual force effect.

When touching a fixed obstacle, the members of the robot can be prohibited in carrying out further movements so that the sensors for measuring the current through the electric motors can detect an increased current indicating an increased momentum. When a certain threshold of the current is exceeded, the second means can be triggered.

When, for instance, a manual force is applied onto the free robot member similar actions can take place. The current amount can change at times so that the second means may be triggered.

For example, in the case of a manual force onto at least the free robot member it may be important to detect the direction of the force vector. The second means, for example the robot controller, can have the information about the calculated movement path and the homing speed which can be, for example, stored thereon within the movement program. Suitable sensors are for example provided at several areas of the robot, especially at the joints of the members. These sensors can detect the results of the force effect onto themselves and calculate the direction of the force vector by vector analysis. This analysis can be carried out by a dedicated signal processing device but also by the second processing means. The direction of the force vector also may be detected based on the signals of a digital camera, which observes the working area of the robot.

The detection of a certain force may provide different control methods for the robot:

In case of an unintended collision with an operator (representing a moveable obstacle) the robot may either be stopped or may continue its movement, for example with a slower speed. In the last variant, the operator moves out of the way of the robot member immediately after the collision with the robot and the robot continues its movement since the obstacle is moving away. An endangering of the operating person can be excluded at all times due to the design of the robot.

In the case of a collision with a fixed obstacle the robot may be stopped and may continue its work after some time, for example after removing the fixed obstacle. It is also possible that the robot will move back in opposite direction of its predetermined movement path or remove from the obstacle by moving cross-wise to the predetermined moving path.

During the period until stopping of the robot, some measures may take place whereby after the detection of the collision, the severity of the collision can be calculated so that different predetermined control or triggering orders can be provided, see also herein.

The severity of a collision may be determined based on a physical amount (e.g., a measured momentum or a measured current change, for example). Such physical measurement signals may be gathered, for example, by current sensors of the motor drives, force sensors or even force sensor pads which can be attached on several surface areas of the robot members respectively of the robot arm.

In a case of an interaction, the control function of the second means might not comprise any safety aspects. The control function rather can be configured to aim for carrying out the operation of the system in a suitable way. This could be everything in-between a stop and a change of movement speed and/or movement path.

The robot may execute a flexible control for the desired position point, for example, in the case of a collision of the robot member with an operating person. The control method can implement a virtual spring constant at the joint points.

Hence the robot may temporarily apply a pressure force against the person so that the person will leave the working area or fence of the robot. The direction of the temporarily applied force may also contain the information for the person in which direction the collision area should be left.

According to another exemplary control method, the robot can move back to its original start point or a location on the movement path before the interaction point from where the robot may be able to continue with its work according to the programmed movement path.

But it is also within the scope of the disclosure that in a case of an interaction in an extreme variant, other devices within a production plant might be stopped.

Referring to FIG. 1, an exemplary small robot 10 includes a base 11, a first member 13 being linked to the base 11 by an axle 12 and a second member 15 being linked to the first member 13 by a second axle 14. The end of the second member 15 can be provided with a gripping device 15a or a similar device. The robot 10 is turnable around an axle A-A extending vertically in the centre through the base 11.

The first member 13 is turnable around the first axle 12 according to the double arrow direction 16 which turning movement provides a movement of the first member 13 in double arrow direction 18 which itself causes a swing movement in double arrow direction 19. In the areas of the axles 12 and 14 motors and gears are arranged with motors which can be designed as servo motors. The gear devices transfer the turning movement of the axles of the motors onto the members whereby these gear devices enable a movement forward and back according to the double arrow direction 17 or 19. Then the grip device 15a moves along a movement path which is predicted by a movement program, see below.

On the assumption that the length of a member is 1 m, the mass of the member is for example 3 kg, and the turning speed of the member is 1 rad/sec, then a turning moment onto the robot member 15 of nearly 100 Nm results which corresponds to a stopping force of 100 N. An exemplary stopping time will amount to 10 msec with a stopping distance of 5 mm and a stopping angle of 5 millirad. An exemplary power with which the member acts onto the hand is 50 Watt. These amounts are under the exemplary norm amounts of 80 Watt and 150 N.

This calculation may take place at a small robot's member 15 acting onto a hand and vice versa.

Figure 2:
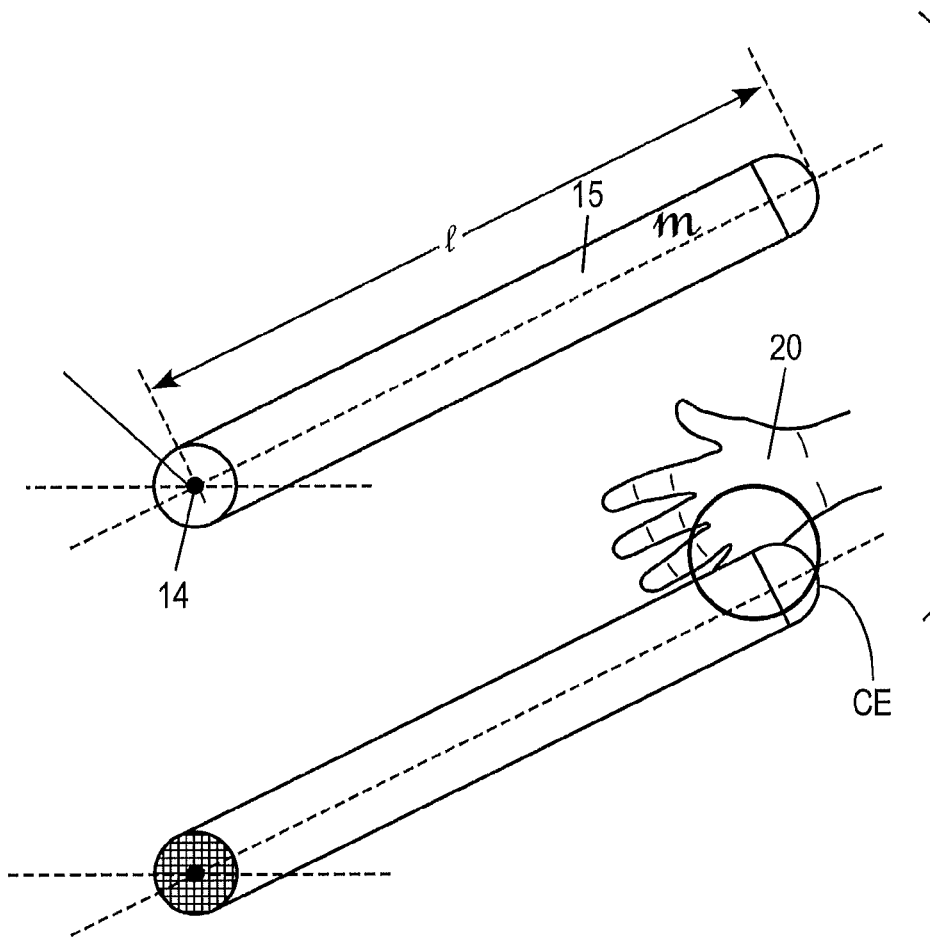
FIG. 2 is an exemplary schematic model showing dynamic relations of a robot with one member.
Figure 3:
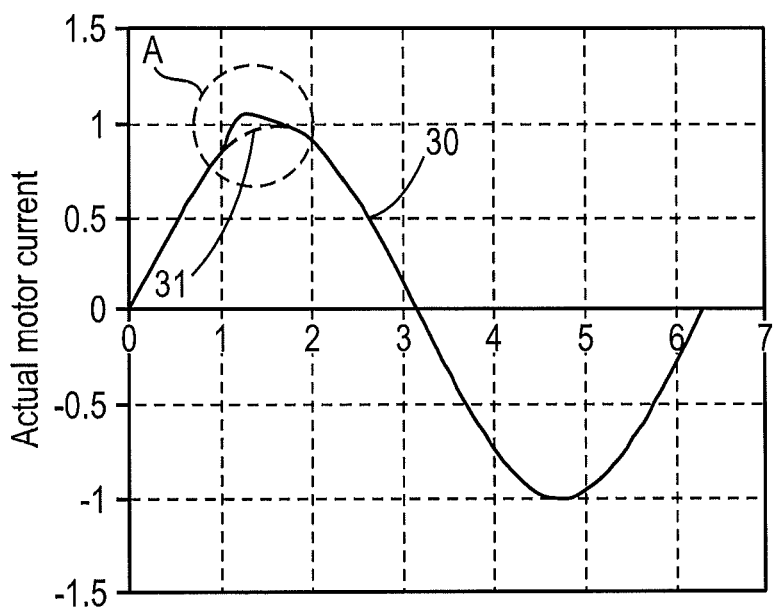
FIGS. 3 to 5 show an actual current course having an interaction, an expected ideal current course, and a difference between both current courses.
Figure 4:
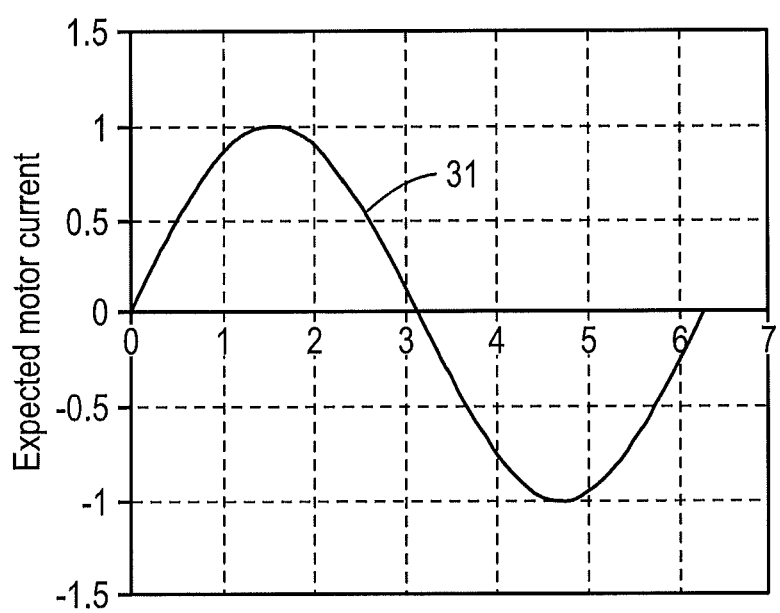
Figure 5:
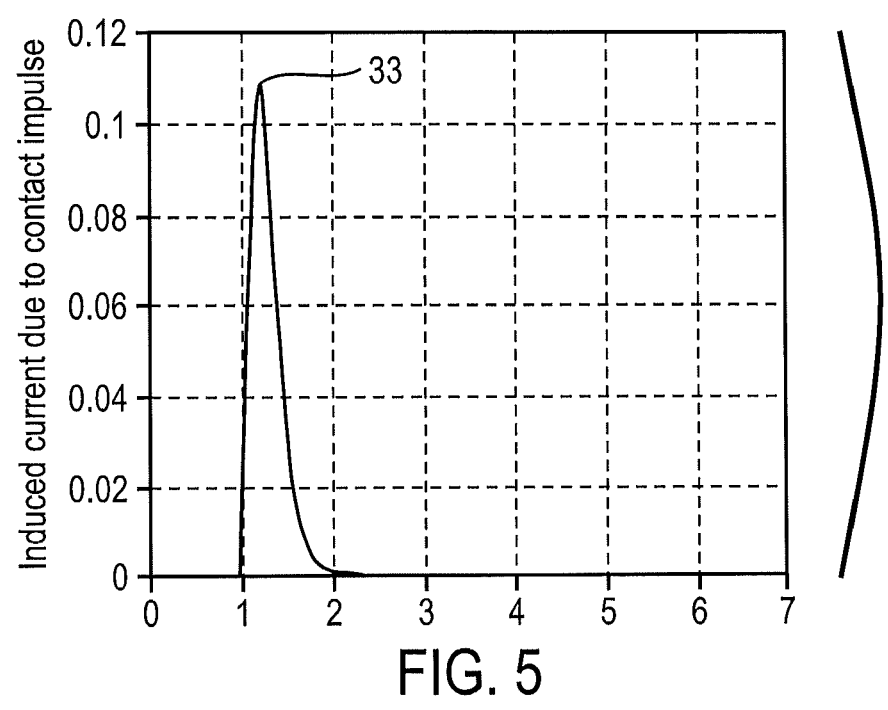

For example, motor currents flowing through the electro motors may be used for detecting a collision. If a robot member 15 acts onto an obstacle the current over the time can be obtained, for example, according to FIG. 3. The current course 30 shows a divergence from the expected motor current 31 according to FIG. 4. The motor current 30 can be increased by the collision of the member 15 against the hand 20 as shown in FIG. 2, see area A in which area the actual measured current 31 is somewhat higher then the expected current which is depicted by the dotted line. The course of this difference over time is depicted in FIG. 5 in a larger scale. Nearly at the time point of 1.3 on the x-axis a current peak 33 has occurred whose height corresponds in principal to the collision impulse. The lower the speed of the robot member 15 is, the lower the current peak 33 may be.

The current peak 33 may be compared with a threshold in a further processing step so that by this further step the severity of the collision may be calculated. It is possible to calculate the area under this peak by integration or to digitizing the picture of the current and then comparing these amounts with a threshold amount which can be stored in a database.

Figure 6:
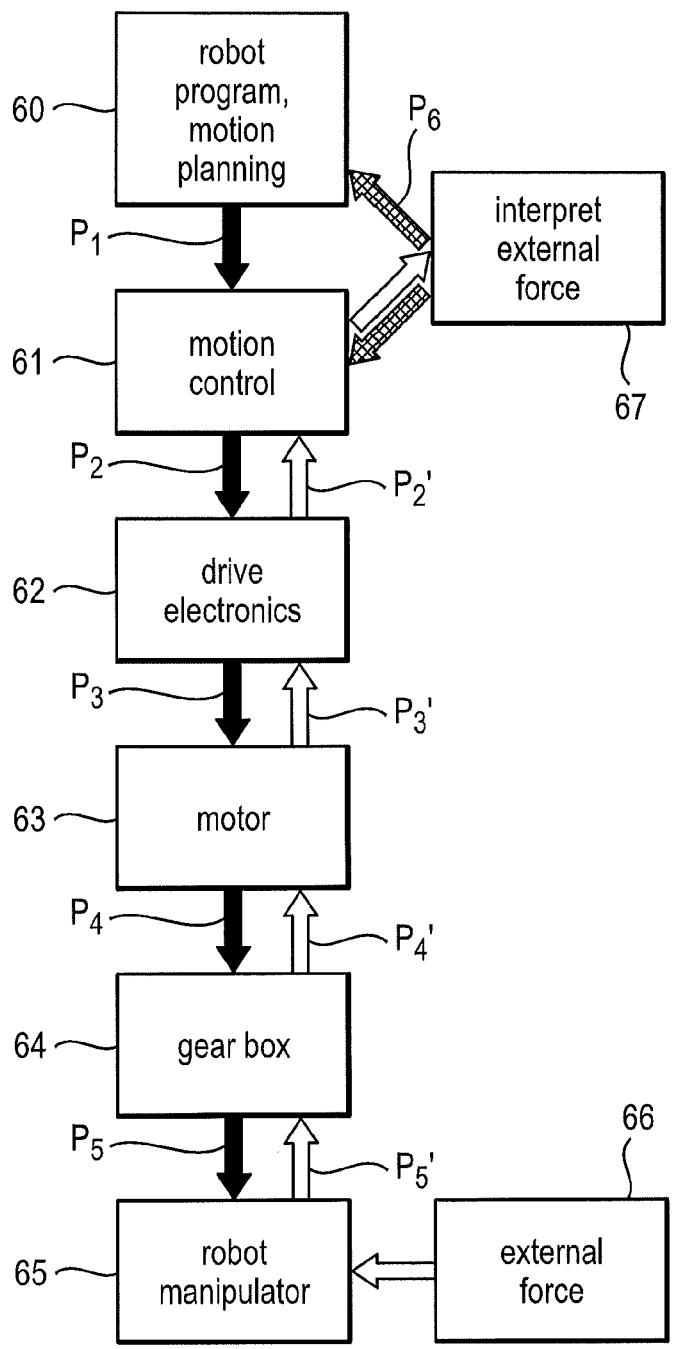
FIG. 6 is an exemplary schematic flow diagram of data flow.

FIG. 6 shows an exemplary flow diagram for a robot control. The movement program for the movement planning is stored in a data processing device and is marked in FIG. 6 with the number 60. Movement programs are known and are used in several types of industrial robots but also for intrinsically safe robots.

According to the movement program 60 data signals 61 are applied to a movement control device 61, for example a robot controller such as the second means, according to the arrow P1. The output signals of the control device 61 according to the arrow P2 are applied to a drive electronic device 62. This device 62 drives a motor 63, see P3, which motor 63 is assigned for instance to the arm 15 of the robot 10 for initiating the movement of the rerated member 15. The electronic device 62 is able to control further motors according the number of the moving axes of the robot. A gear device 64 can be arranged between the motor 63 and the member 15 whereby the robot manipulator is starting and executing its movement according to the robot program. The signal and data flow between the motor 63 and the gear device 64 are shown by the arrow P4 and the signal flow to the robot manipulator is shown by the arrow P5.

Now the robot member 15 may hit an obstacle so that an external force 66 is applied onto the robot member or the robot manipulator. This outer external force 66 acts onto the motor according the arrows P5' and P4' so that the expected current and the measured current will differ. A difference over the time may be detected (see FIG. 5) and can be processed by a processing device based on the peak 33. This peak 33 can be compared with a threshold amount so that is possible to calculate whether it was a light, medium severity or severe collision. Depending on the severity of the collision the program can be stopped, the manipulator may run back to the starting point or the movement can be continued as if there was no collision according to arrow P 6. There may be further activities (e.g., changes in movement for getting out of the way, back track movements or movements similar to the programmed movement) preventing an interruption of the manufacturing process of the robot 10.

The external force may be applied for example by a manual push onto the manipulator 65 or robot member 15, for example while a person and a robot are co-operating and are working together side by side. The person or operator will be able to influence the movement of the robot by one or more pushes in the case that the robot acts in an erroneous way.

Whether the force is applied by hitting against an obstacle or by a push can be determined according to the duration of the force, for example. The curve 33 of FIG. 5 for example may not have a rather high peak but on the other side a rather high duration width in the curve. If the robot proceeds against an obstacle the duration of the change of the motor current will be longer than of the duration of a manual push onto the manipulator. This curve shape may be detected and processed by the interpretation unit 67 so that the corresponding movement variant laid down in the movement program can be produced for further movement or robot activity.

Figure 7:
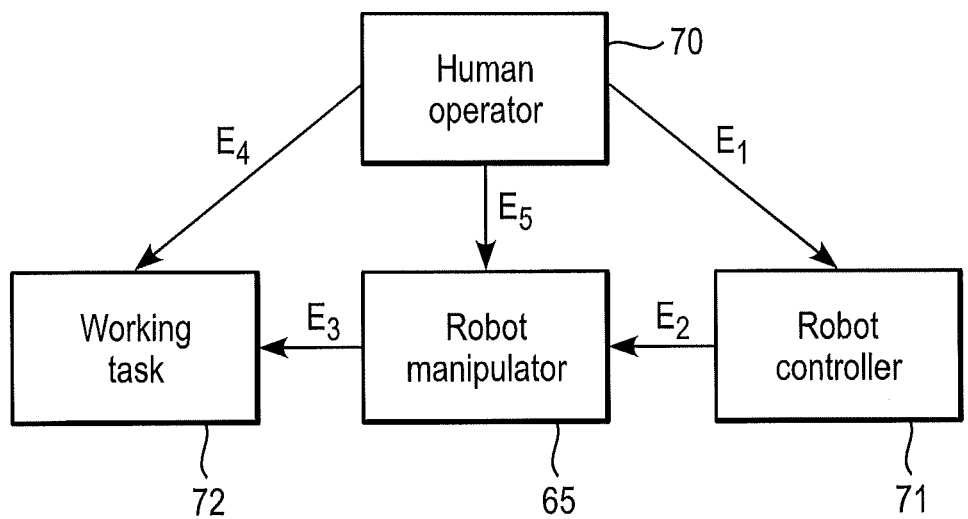
FIG. 7 is an exemplary schematic flow diagram of a system.

FIG. 7 shows another exemplary flow diagram for a human robot collaboration task. An operating person 70 starts the robot program within the robot controller 71 as indicated with the arrow E1. Now the robot program is continuously executed and the robot controller 71 gives control signals to the robot manipulator 65 as indicated with the arrow E2. The robot executes its share of the collaboration task 72 according to the movement program as indicated with the arrow E3 whereas the human operator also contributes its share on the working task 72 as indicated with the arrow E4. The human operator has the possibility to give some additional commands to the robot manipulator according to the arrow E5. This might be, for example, a hit on the robot arm which can be interpreted by a routine according to the box 67 in FIG. 6.

The outcome of this interpretation might be, for example, that the robot switches over to another movement program or stops the current robot program for example.

Figure 8A:
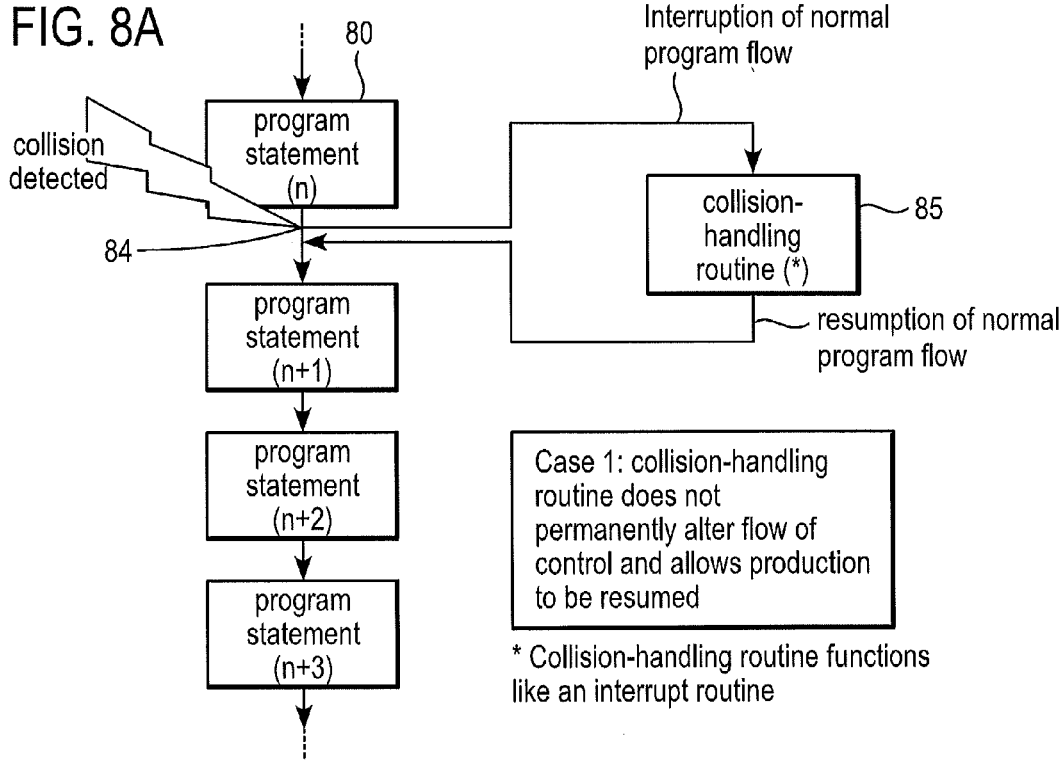
FIGS. 8a, 8b show two exemplary possibilities for behavior of a robot in a case of an interaction.
Figure 8B:
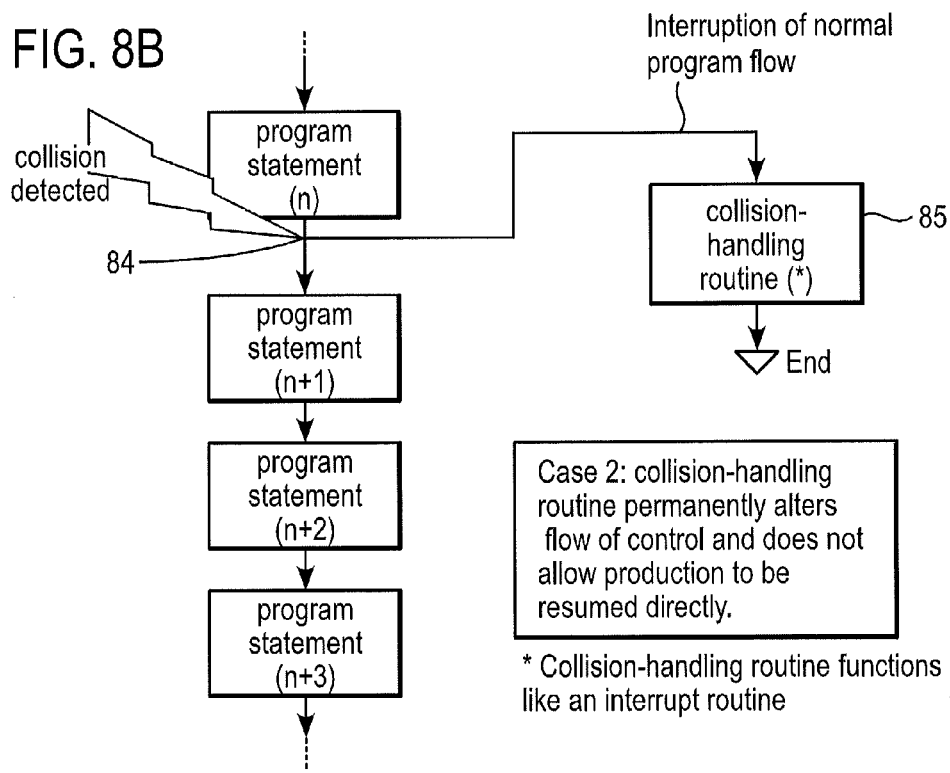

Now the FIGS. 8a and 8b are described. In FIG. 8a, the exemplary program can be started with program statement n. Then a collision is detected which is shown by number or point 84. This collision influences a collision routine 85 which is working like an interruption routine. In the case of a light collision the routine interrupts the program statement but allows a continuation or resumption of the production. It acts onto the program control and the further processing proceeds according to the program statements n+1, n+2 . . . .

In the second case, FIG. 8b, of a severe collision the exemplary collision routine 85 changes the program statement long-term and does not allow a resumption of the production but ends the program statement, depicted by "END". It is also possible for example to stop the robot movement only for a chosen time.

An exemplary advantage of embodiments of the disclosure is that specially designed input devices like push buttons or similar devices which might be implemented into the robot can be avoided because it is possible to give these orders by a push or useful push combinations directly to the robot. For instance, the operator puts a work piece into the manipulator and signals to the robot by one push or more pushes that it may start its work whereby the push signals to the robot: "work piece is in place." This push or these pushes has or have the function of a transfer from a manual to an automatic working step which is done by the robot.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A robot comprising:
   at least one turnable member, a free end of the member being moveable along a programmable path;
   first means for detecting at least one of a force, pressure or contact effect on an interaction point on the free end of the member, wherein the at least one of the force effect, the pressure, or the contact effect is caused by a manual force onto the member of the robot;
   means for producing signals corresponding to the force or pressure or contact effect; and
   second means for controlling robot movement according to the programmable path and according to predicted demands in response to the detecting of at least one of a force, pressure or contact effect and for temporarily changing the programmable movement path based on the produced signals such that robot movement is at least one of temporarily stopped or slowed down.

2. The robot of claim 1, wherein the first means comprise:
   a device for metering current and/or current values over time through at least one electric motor drive which is configured to actuate the turnable member.

3. The robot of claim 2, wherein the second means comprise:
   at least a processing unit, the signals of the current metering being feedable into the processing unit which is configured to compare the current signals with at least one threshold value.

4. The robot of claim 2, wherein the electric motor device is a servomotor.

5. The robot of claim 1, wherein the first means comprise:
   a momentum sensor arranged at an axle of the turnable member of the robot.

6. A method for controlling a robot comprising:
   applying a force effect onto an interaction point on a turnable member of the robot, wherein the force effect is caused by a manual force onto the member of the robot;
   generating signals according to the force effect;
   processing, by a computer processor, the signals into control signals for the robot; and
   controlling the robot to temporarily change a movement path of a free end of a robot member such that movement of the robot is temporarily at least one of stopped or not slowed.

7. The method of claim 6, comprising:
   determining severity of the force effect by comparing the force effect signal with threshold data.

8. The method of claim 7, comprising:
   analyzing signal values of the signals generated according to the force effect by Fourier analysis during the processing of the signals generated according to the force effect to provide analyzed data; and
   comparing the analyzed data with the threshold data.

9. The method of claim 6, wherein the force effect is caused by a collision of the at least one turnable member of the robot with a person near the robot or with another obstacle.

10. The method of claim 6, comprising:
    controlling the free end of the robot member to carry out a back track movement on a predicted movement path.

11. The method of claim 6, comprising:
    controlling the free end of the robot member on a path comprising a crosswise component from the interaction point.

12. The method for controlling the robot according to claim 6, wherein the robot comprises:
    at least one motor actuated turnable member with a gear device between the motor and the robot member, the gear device providing for a forward and backtrack movement of the robot member.

13. The method for controlling the robot according to claim 12, comprising:
    measuring the force effect by sensing means for motor current and comparing the measured motor current with a time-related expected motor current such that a peak difference signal between measured and expected signals indicates severity of the force effect.

14. The method of claim 13, comprising:
    comparing peak difference with at least one threshold value, and generating a control signal for the robot when the at least one threshold value is exceeded.

15. The method of claim 13, comprising:
    integrating the difference signal.

16. The method of claim 6, comprising:
    generating at least two control signals; and
    choosing one control signal from a list of control signals for the robot.

* * * * *